United States Patent Office 2,862,836
Patented Dec. 2, 1958

2,862,836
IN SITU POLYAMIDE COATING METHOD

Johan C. D. Oosterhout, Port Arthur, Tex., assignor to The Texas Company, New York, N. Y., a corporation of Delaware No Drawing. Application March 14, 1955
Serial No. 494,253

5 Claims. (Cl. 117—65)

The present invention relates to a novel method of protecting various solid bodies by applying protective surface coatings thereon. It is especially concerned with protecting against corrosion such metal bodies as the internal walls of steel cargo tanks in tank ships, ballast tanks, and storage vessels. The invention also relates to novel articles of manufacture having improved protective coatings thereon.

In accordance with the present invention there is provided a novel method of protecting a body comprising applying to a surface of the body a coating or layer of a salt derived from the reaction of a diamine of the formula $H_2NCH_2RCH_2NH_2$ and a dicarboxylic acid of the formula $HOOCCH_2R'CH_2COOH$. In these formulae R and R' are divalent hydrocarbon radicals free from olefinic and acetylenic unsaturation, and R has a chain length of at least two carbon atoms.

Then the protective coating is set up by converting the layer of salt to the corresponding polyamide, this being accomplished by heating the salt layer at an amide-forming temperature between 80 and 300° C. This heating is accomplished advantageously by bringing hot water and/or steam into contact with the salt layer, as by directing a stream from a nozzle against the coated wall of a tank.

The resulting article of manufacture has a surface protective layer of a polyamide which is tough, tightly adherent to the wall, and insoluble in most common solvents. It is particularly of great value because of its insolubility in petroleum distillates which are often transported in the cargo tanks of tank ships; and its insolubility in water, with which ship tanks are ballasted.

Reference is made to U. S. Patent 2,130,947, granted September 20, 1938, to Wallace Hume Carothers, for details of preparation of the salt.

More in detail, the most useful salts for the present invention are those derived from diamines of formula $H_2NCH_2RCH_2NH_2$ and dicarboxylic acids of formula $HOOCCH_2R'CH_2COOH$, in which R and R' are divalent hydrocarbon radicals free from olefinic acetylenic unsaturation and in which R has a chain length of at least two carbon atoms. The R and R' may be aliphatic, alicyclic, aromatic, or araliphatic radicals. Of this group of salts, those in which R represents $(CH_2)_x$ and R' represents $(CH_2)_y$, where $x$ and $y$ are integers and where $x$ is at least 2, form a select class. Polyamides derived from this select class of salts are all characterized by high tenacity, high orientation, lack of sensitivity to conditions of humidity, exceptionally good elastic recovery, extraordinary resistance to most solvents and chemical agents, and exceptionally good ageing characteristics in air even at moderately elevated temperatures.

The diamine-dicarboxylic acid salts employed in this invention are crystalline solids having fairly definite melting points. They are relatively insoluble in acetone, ether, and benzene. They are soluble in water and alcohol-water mixtures.

Examples of typical salts are given below in Table I.

TABLE I
*Diamine-dicarboxylic acid salts*

| Diamine | Acid | M. P., °C |
|---|---|---|
| Tetramethylene | Azelaic | 175–176 |
| Pentamethylene | Sebacic | 129–131 |
| Hexamethylene | Adipic | 183–184 |
| Do | Sebacic | 170–172 |
| Octamethylene | Adipic | 153–154 |
| Do | Sebacic | 164–165 |
| Nonamethylene | Adipic | 125–127 |
| Do | Sebacic | 159–160 |
| Decamethylene | Adipic | 142–143 |
| Do | p-Phenylene diacetic | 192–194 |
| Undecamethylene | Sebacic | 153–155 |
| Dodecamethylene | Adipic | 144–145 |
| Do | Sebacic | 157–158 |
| p-Xylylene | do | 210–212 |
| Do | p-Phenylene diacetic | 250–252 |

Elementary analysis of the salts indicates that they are derived from substantially one mol each of diamine and dibasic acid. This is true even when the salts are crystallized from solutions containing a moderate excess of either reactant. These salts are of the formula

$$H_2NCH_2RCH_2NH_2 \cdot HOOCCH_2R'CH_2COOH$$

and dissociate in water to give diammonium ions of the formula $^+NH_3CH_2RCH_2NH_3{}^+$ and dicarboxylic ions of the formula $^-OOCCH_2R'CH_2COO^-$. R and R' are as heretofore defined. In some cases, however, the salt may contain a small excess, seldom reaching 2%, of either acid or amine. As examples of such salts might be mentioned decamethylene diammonium adipate and nonamethylene diammonium adipate. On the other hand, certain salts, e. g. hexamethylene diammonium adipate, always contain equivalent amounts of amine and acid within 0.1%.

The expression "dibasic carboxylic acid" is used to include carbonic acid and dicarboxylic acids. By "amine-forming derivatives of dibasic carboxylic acids" I mean those materials such as anhydrides, amides, acid halides, half esters, and diesters, which are known to form amides when reacted with a primary or secondary amine.

Examples of the preparation of salts employed in the present invention are given in the above mentioned patent and should not require repetition here.

In place of using the diamine and dicarboxylic acid, a diamine and an amide forming derivative of a dibasic carboxylic acid may be used in the preparation of the polyamide. The reaction may be carried out in the absence of a solvent, in the presence of a solvent, in the presence of a diluent which is not a solvent for the polymer, or in the presence of a mixture of solvent and diluent.

EXAMPLE I

The cargo tank of a tank ship was filled with a water solution of hexamethylene diammonium adipate salt resulting from the reaction of 144 parts of hexamethylene diamine with 174 parts of adipic acid, after which the solution was removed from the tank leaving a layer of the salt as a thin coating on the top, bottom and side walls. After this, streams of extremely hot water obtained by injecting steam directly into a water line were directed from nozzles against the walls of the tank, the temperature of the water being about 80–90° C.

A coarse hard protective film of converted polyhexamethylene adipamide was observed to form, which was insoluble in petroleum distillates and water.

EXAMPLE II

An iron strip was dipped into a water solution of a salt of the type described above in Example I, and the film left on the strip was exposed to a jet of steam at a temperature of about 120° C. The resulting coarse hard film of polyamide could not be removed with hot gas oil.

The polyamide film formed on the walls by the method of the present invention is a linear polymer having structural units linked end to end and in chain-like fashion. A plurality of amide linkages appear in the chain of atoms which makes up the polymer.

The molecular weight of the polyamide lies in the neighborhood of 1000 to more than 7000. Two of the most characteristic properties of these polyamides are their high melting points and low solubility. Below their melting points the polyamides when examined by X-rays, generally furnish sharp X-ray crystalline powder diffraction patterns which is evidence of their crystalline structure in the massive state. Their density generally lies between 1.0 and 1.2 and their refractive index is usually in the neighborhood of 1.53.

The polyamide layer is completely resistant to the common organic solvents except such materials as hot acetic acid, formic acid, or phenols, and it can, for example, be immersed in boiling toluene without any noticeable effect. Thus, it is highly effective in preventing the corrosion of steel tank walls which are in contact with water, gasoline, diesel oil, fuel oil, kerosene and the like.

Obviously, many modifications and variations of the invention, as hereinbefore set forth, may be made without departing from the spirit and scope thereof, and therefore only such limitations should be imposed as are indicated in the appended claims.

I claim:

1. A method of protecting a body comprising applying to a surface thereof a layer of a salt of the formula $H_2NCH_2RCH_2NH_2 \cdot HOOCCH_2R'CH_2COOH$ derived from the reaction of a diamine of the formula $$H_2NCH_2RCH_2NH_2$$

and a dicarboxylic acid of the formula $$HOOCCH_2R'CH_2COOH$$

in which R and R' are divalent hydrocarbon radicals free from olefinic and acetylenic unsaturation and in which R has a chain length of at least two carbon atoms; and then converting said salt in situ to the corresponding polyamide by heating said salt to a temperature of 80–300° C.

2. A method in accordance with claim 1, wherein said heating is accomplished by bringing at least one of the group hot water and steam into contact with said layer.

3. A method of protecting an inside wall of a tank comprising applying to a surface thereof a layer of a salt of the formula $$H_2NCH_2RCH_2NH_2 \cdot HOOCCH_2R'CH_2COOH$$

derived from the reaction of a diamine of the formula $$H_2NCH_2RCH_2NH_2$$

and a dicarboxylic acid of the formula $$HOOCCH_2R'CH_2COOH$$

in which R and R' are divalent hydrocarbon radicals free from olefinic and acetylenic unsaturation and in which R has a chain length of at least two carbon atoms; and then heating said salt to a temperature of 80–300° C. by directing against said wall a stream of at least one of the group hot water and steam, thereby converting said salt in situ to the corresponding polyamide.

4. A method in accordance with claim 1 wherein said salt is hexamethylene diammonium adipate, said diamine is hexamethylene diamine, said acid is adipic acid, and said polyamide is polyhexamethylene adipamide.

5. A metal body having on a surface thereof a protective layer of polyamide resulting from applying to said surface a salt of the formula $$H_2NCH_2RCH_2NH_2 \cdot HOOCCH_2R'CH_2COOH$$

derived from the reactant of a diamine of the formula, $H_2NCH_2RCH_2NH_2$ and a dicarboxylic acid of the formula $HOOCCH_2R'CH_2COOH$ in which R and R' are divalent hydrocarbon radicals free from olefinic and acetylenic unsaturation and in which R has a chain length of at least 2 carbon atoms, and then heating said salt to a temperature of 80–300° C.

References Cited in the file of this patent

UNITED STATES PATENTS

| | | |
|---|---|---|
| 2,252,554 | Carothers | Aug. 12, 1941 |
| 2,330,333 | Brubaker | Sept. 28, 1943 |
| 2,359,878 | Schupp | Oct. 10, 1944 |
| 2,393,972 | Cairns | Feb. 5, 1946 |
| 2,405,965 | Leekley | Aug. 20, 1946 |
| 2,544,637 | Caldwell | Mar. 13, 1951 |
| 2,728,737 | Witcoff | Dec. 27, 1955 |
| 2,746,941 | Horn | May 22, 1956 |

UNITED STATES PATENT OFFICE
CERTIFICATE OF CORRECTION

Patent No. 2,862,836                                                                   December 2, 1958

Johan C. D. Oosterhout

It is hereby certified that error appears in the printed specification of the above numbered patent requiring correction and that the said Letters Patent should read as corrected below.

Column 4, line 30, for "reactant" read -- reaction --.

Signed and sealed this 10th day of March 1959.

(SEAL)
Attest:

KARL H. AXLINE
Attesting Officer

ROBERT C. WATSON
Commissioner of Patents